United States Patent
Matsuzaki et al.

(10) Patent No.: US 9,505,374 B2
(45) Date of Patent: Nov. 29, 2016

(54) SIDE IMPACT AIRBAG APPARATUS

(71) Applicant: TOYODA GOSEI CO., LTD., Kiyosu-shi, Aichi-ken (JP)

(72) Inventors: Yuji Matsuzaki, Kiyosu (JP); Yasushi Masuda, Kiyosu (JP); Takayuki Yamanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/851,012

(22) Filed: Sep. 11, 2015

(65) Prior Publication Data

US 2016/0114755 A1 Apr. 28, 2016

(30) Foreign Application Priority Data

Oct. 23, 2014 (JP) .................................. 2014-216183

(51) Int. Cl.
| | |
|---|---|
| B60R 21/233 | (2006.01) |
| B60R 21/2338 | (2011.01) |
| B60R 21/231 | (2011.01) |
| B60R 21/2334 | (2011.01) |
| B60R 21/207 | (2006.01) |
| B60R 21/264 | (2006.01) |

(52) U.S. Cl.
CPC ......... B60R 21/2338 (2013.01); B60R 21/207 (2013.01); B60R 21/2334 (2013.01); B60R 21/23138 (2013.01); B60R 21/264 (2013.01); B60R 2021/23146 (2013.01); B60R 2021/23386 (2013.01)

(58) Field of Classification Search
CPC .................... B60R 21/2338; B60R 21/23138; B60R 21/264; B60R 21/207; B60R 2021/23146; B60R 2021/23386
See application file for complete search history.

(56) References Cited

U.S. PATENT DOCUMENTS

| | | | |
|---|---|---|---|
| 8,047,564 B2 * | 11/2011 | Kibat | B60R 21/23138 280/730.2 |
| 8,360,469 B2 * | 1/2013 | Wiik | B60R 21/23138 280/730.2 |

(Continued)

FOREIGN PATENT DOCUMENTS

| | | |
|---|---|---|
| EP | 2 979 934 A1 | 2/2016 |
| JP | 2005-306377 A | 11/2005 |
| JP | 2008-302897 A | 12/2008 |

(Continued)

OTHER PUBLICATIONS

Extended European Search Report dated Mar. 9, 2016 issued in corresponding European patent application No. 15184802.5.

Primary Examiner — Drew Brown
(74) Attorney, Agent, or Firm — Posz Law Group, PLC

(57) ABSTRACT

A side impact airbag apparatus includes an airbag, a gas generator, and a strap. The airbag is fixed to an automobile via an attaching portion in a rear lower portion. The gas generator supplies inflation gas to the airbag. The airbag includes a first section. The inflation gas deploys and inflates the airbag diagonally forward and upward from a part at which the airbag is fixed to the automobile. The front end of the strap is attached to the front end of the airbag. The rear end of the strap is attached to the fixed part of the airbag. The strap includes an upper strap portion, which is tensioned when the airbag is deployed and inflated, and a lower strap portion, which is located below the upper strap portion. The lower strap portion is tensioned with a tensile force greater than that of the upper strap portion.

4 Claims, 8 Drawing Sheets

(56) References Cited

U.S. PATENT DOCUMENTS

| | | | |
|---|---|---|---|
| 8,684,408 B2 * | 4/2014 | Thomas | B60R 21/231 280/730.2 |
| 2005/0236819 A1 | 10/2005 | Riedel et al. | |
| 2006/0038386 A1 * | 2/2006 | Shibayama | B60R 21/23138 280/730.2 |
| 2010/0194083 A1 | 8/2010 | Sugimoto et al. | |
| 2012/0091697 A1 | 4/2012 | Wiik et al. | |
| 2014/0103625 A1 * | 4/2014 | Thomas | B60R 21/231 280/730.2 |
| 2015/0314748 A1 * | 11/2015 | Mihm | B60R 21/2338 280/730.2 |

FOREIGN PATENT DOCUMENTS

| | | |
|---|---|---|
| JP | 2012-081958 A | 4/2012 |
| WO | 01/49535 A1 | 7/2001 |

* cited by examiner

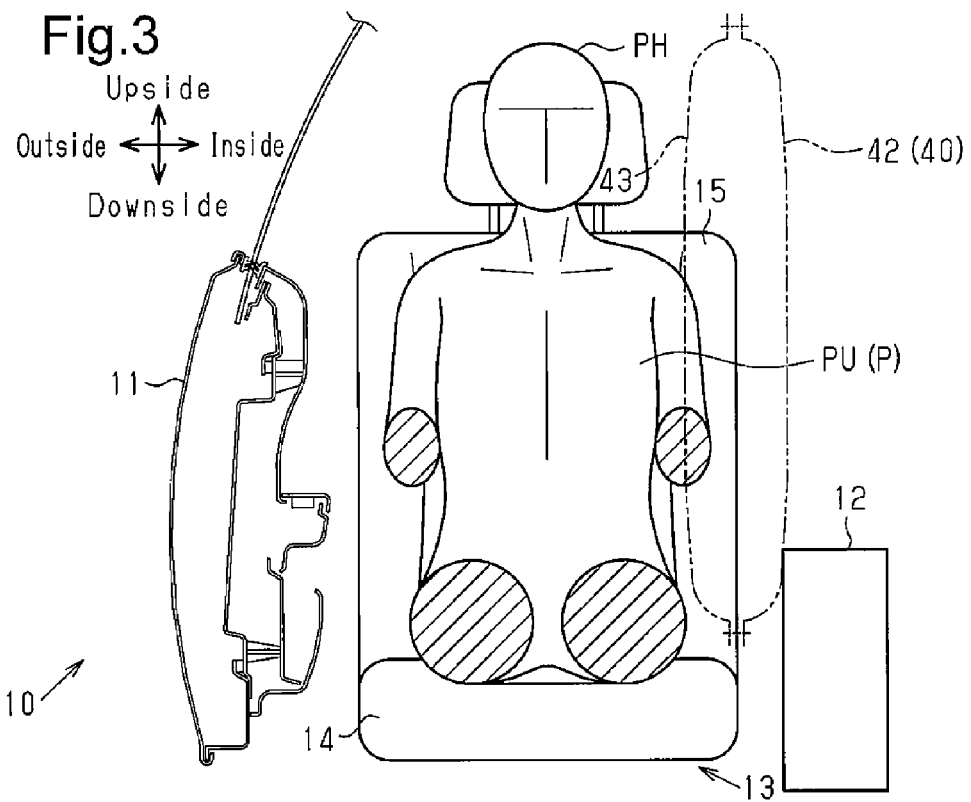
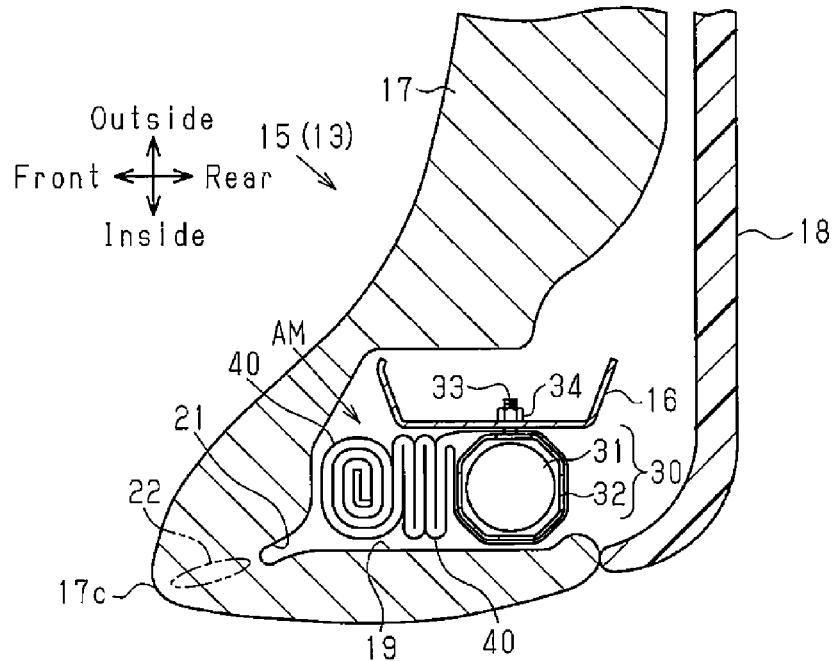

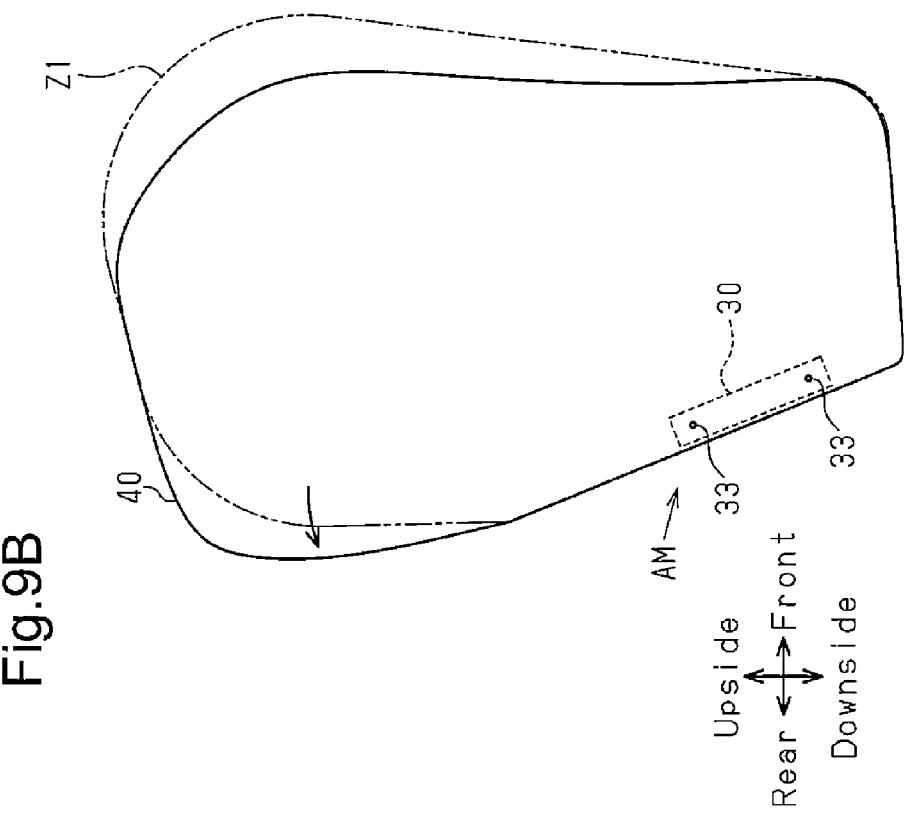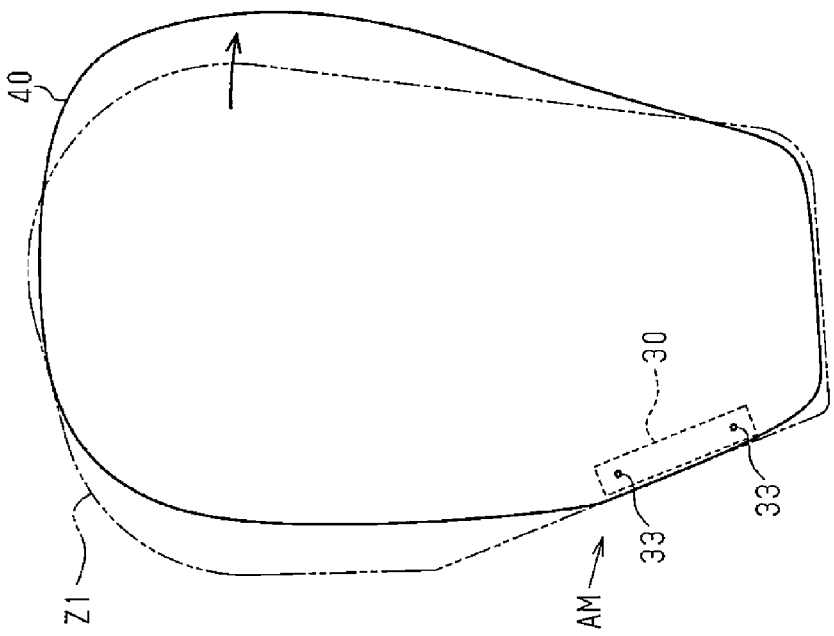

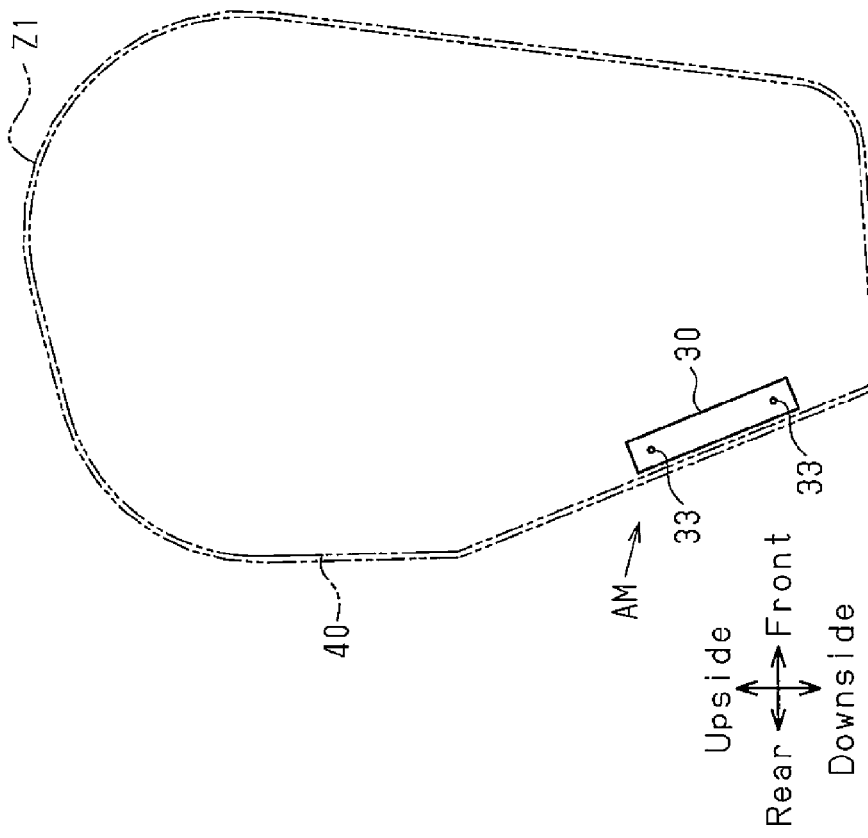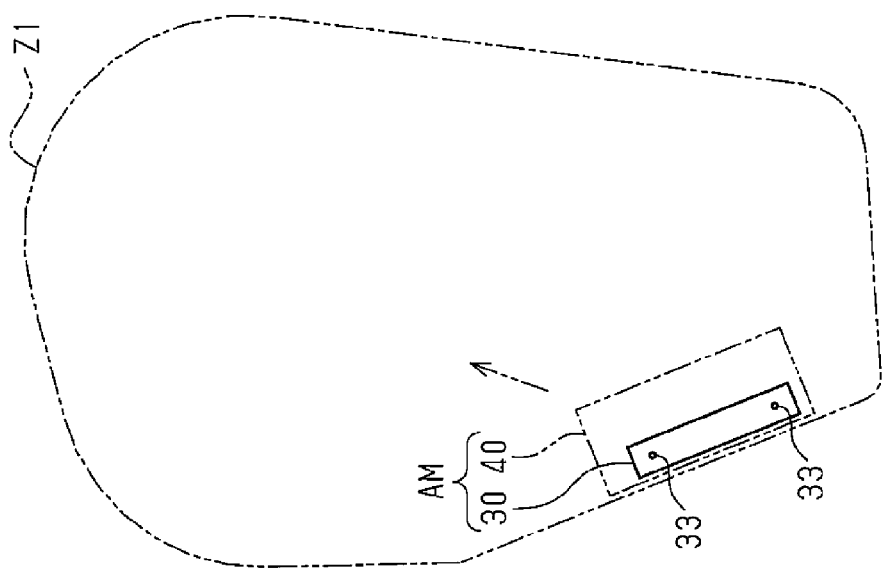

SIDE IMPACT AIRBAG APPARATUS

BACKGROUND OF THE INVENTION

The present invention relates to a side impact airbag apparatus that protects an occupant seated in a vehicle seat from an impact by deploying and inflating an airbag in the vicinity of a side of the occupant when the impact is applied to the vehicle from the side of the vehicle seat.

Some automobiles are equipped with seats arranged side by side in the width direction. In such an automobile, when an impact is applied to a body side portion due to a side collision, it is important to protect not only the occupant seated in the seat on the side closer to the body side portion that has received the impact (the seat on the impact side), but also the occupant seated in the seat on the side farther from the impact receiving body side portion (the seat on the side opposite to the impact). Side impact airbag apparatuses are effective as means for protecting occupants located on the impact side and on the side opposite to the impact. When an impact is applied to the automobile due to a side collision, the side impact airbag apparatus causes a gas generator to generate inflation gas. The inflation gas deploys and inflates an airbag at a position close to the side of an occupant to reduce the impact. Particularly, a side impact airbag apparatus for protecting an occupant on the side opposite to the impact receives the occupant on the side opposite to the impact. This restrains the occupant on the side opposite to the impact from interfering with the occupant on the impact side or interior parts.

One form of a side impact airbag apparatus for protecting an occupant on the side opposite to the impact includes an airbag and a gas generator arranged in the rear lower portion of the airbag. The airbag, together with the gas generator, is fixed to an automobile seat. At a position close to the side of the upper body of an occupant, including the head, the airbag is deployed and inflated diagonally forward and upward from the fixed position. In this type of side impact airbag apparatus, it is important to deploy the airbag within a predetermined deployment area in a short time to properly protect the occupant.

However, since the airbag is fixed to the automobile seat only at the rear lower portion, the momentum of the diagonally forward and upward deployment and inflation of the airbag cause the airbag to act to fall forward in a rotating manner about the part at which the airbag is fixed to the automobile seat. This may cause the airbag to project forward from the deployment area. Also, after having projected forward, the airbag acts to fall rearward in a rotating manner in reaction, which may cause the airbag to project rearward from the deployment area.

As another form of a side impact airbag apparatus, an apparatus with an airbag having a strap has been proposed (for example, refer to International Publication No. 2001/049535). The front end of the strap is attached to the front end of the airbag, and the rear end of the strap is attached to a part of the airbag that is fixed to an automobile seat or to a part in the vicinity of the fixed part.

In the side impact airbag apparatus disclosed in the above document, the strap is tensioned as the airbag is deployed and inflated and, in turn, applies tensile force to the airbag to restrain the airbag from rotating forward. Accordingly, it is possible to restrain the airbag from falling forward and projecting forward of the deployment area.

However, when the airbag is rotated rearward in reaction, the strap is slackened. The strap therefore cannot restrain the rearward rotation of the airbag. Thus, as in the case without a strap, the airbag acts to fall rearward in a rotating manner. As a result, the airbag may project rearward from the deployment area.

Such problems can occur in a type of side impact airbag apparatus that deploys and inflates an airbag between the body side portion of an automobile and an automobile seat, which is referred to as a near side airbag apparatus.

SUMMARY OF THE INVENTION

Accordingly, it is an objective of the present invention to provide a side impact airbag apparatus that allows an airbag to be deployed and inflated without unnecessarily moving in the front-rear direction.

To achieve the foregoing objective and in accordance with one aspect of the present invention, a side impact airbag apparatus that includes an airbag, a gas generator, and a strap is provided. The airbag is fixed to a vehicle via an attaching portion and is configured to be deployed and inflated diagonally forward and upward in the vicinity of a side of an occupant seated in a vehicle seat and from a part at which the airbag is fixed to the vehicle via the attaching portion. The airbag includes a front end and a first section, and the attaching portion is located in a rear lower portion of the airbag. The gas generator supplies inflation gas to the airbag in response to an impact applied to the vehicle from a side of the vehicle seat. The strap has a front end attached to the front end of the airbag and a rear end attached to one of the part of the airbag at which the airbag is fixed to the vehicle and the vicinity of that fixed part. The strap includes an upper strap portion, which is tensioned when the airbag is deployed and inflated, and a lower strap portion, which is located below the upper strap portion and is tensioned with a tensile force greater than that of the upper strap portion when the airbag is deployed and inflated.

The first section of the airbag corresponds to a section of the airbag that is deployed and inflated at a position in the vicinity of the side of the upper body of the occupant seated in the vehicle seat including the head. With the above configuration, when an impact is applied to the vehicle from the side of the vehicle seat due to a side collision, the gas generator generates inflation gas. The inflation gas is supplied to the airbag, which is fixed to the vehicle via the attaching portion at the rear lower portion. When supplied with the inflation gas, the airbag is deployed and inflated diagonally forward and upward from the rear lower portion, which is fixed to the vehicle, at a position close to the side of the upper body of the occupant including the head. Since the airbag is fixed to the vehicle only at the rear lower portion, the momentum of the diagonally forward and upward deployment and inflation of the airbag causes the airbag to act to fall forward in a rotating manner about the part at which the airbag is fixed to the vehicle. Thereafter, the airbag acts to fall rearward in a rotating manner in reaction.

As the airbag is deployed and inflated, the upper strap portion is tensioned to apply tensile force to the airbag. Further, the lower strap portion, which is arranged below the upper strap portion, is tensioned with a tensile force greater than that of the upper strap portion, so that the lower strap portion applies, to the airbag, a tensile force that is greater than that of the upper strap portion.

The tensile forces of the upper strap portion and the lower strap portion restrict the airbag from rotating forward about the part at which the airbag is fixed to the vehicle via an attaching portion, so that the airbag is restrained from falling forward. If the upper strap portion is slackened when the airbag is rotated rearward in reaction, the lower strap portion remains tensioned. The tensile force of the lower strap portion restricts rearward rotation of the airbag, thereby restraining the airbag from falling rearward.

BRIEF DESCRIPTION OF THE DRAWINGS

FIG. 3 is a cross-sectional front view showing the positional relationship of the automobile seat, the airbag, the occupant, the center console box, and the body side portion in the embodiment of FIG. 1;

FIG. 4 is a partially cross-sectional plan view showing the internal structure of the inner side of the seat back, in which the airbag module of the embodiment of FIG. 1 is installed;

FIGS. 9A and 9B are schematic side views showing, together with a deployment area, an airbag of a comparison example without an upper strap portion or a lower strap portion, in the middle of deployment and inflation;

FIG. 10A is a schematic side view showing, together with a deployment area, a state prior to deployment and inflation of the airbag in the embodiment of FIG. 1; and FIG. 10B is a schematic side view showing, together with the deployment area, a state after deployment and inflation of the airbag in the embodiment of FIG. 1.

DETAILED DESCRIPTION OF THE PREFERRED EMBODIMENTS

A side impact airbag apparatus according to one embodiment will now be described with reference to the drawings. In this embodiment, the side impact airbag apparatus is employed as a far side airbag apparatus for an automobile.

In the following description, the direction in which the automobile advances forward will be referred to as the front, and reverse direction will be referred to as the rear. The middle of the width direction of the automobile is used as reference in the width direction of the automobile. A side closer to the middle of the width direction will be referred to as "inner side" of the automobile, while a side farther from the middle of the width direction will be referred to "outer side" of the automobile. Further, it is provided that an average sized adult occupant is seated on an automobile seat in a predetermined proper posture.

Figure 1:
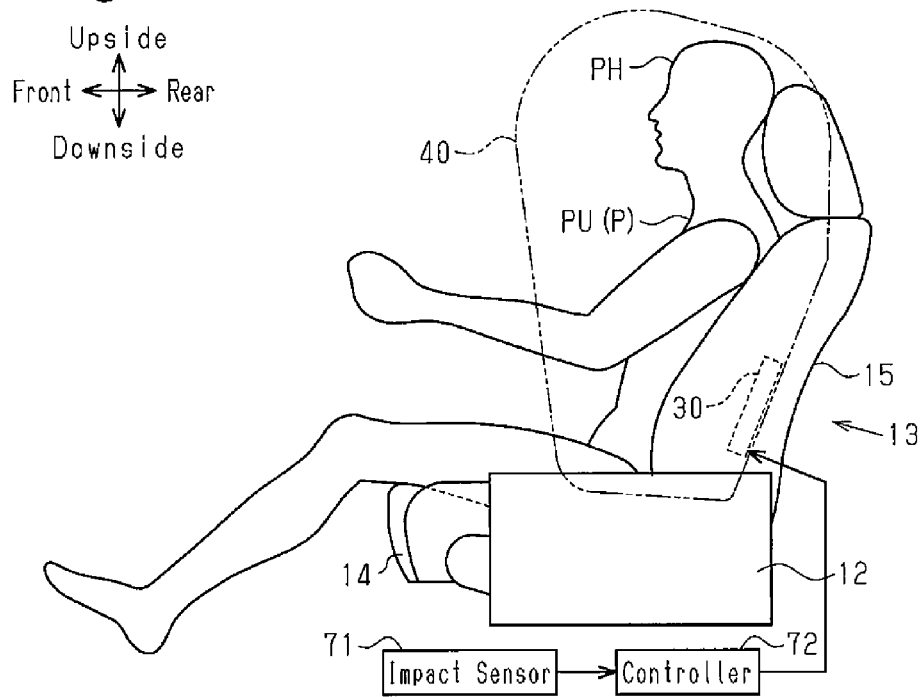
FIG. 1 is a side view of an automobile far side airbag apparatus according to one embodiment of a side impact airbag apparatus, illustrating, together with an occupant and a center console box, an automobile seat in which the apparatus is installed.
Figure 2:
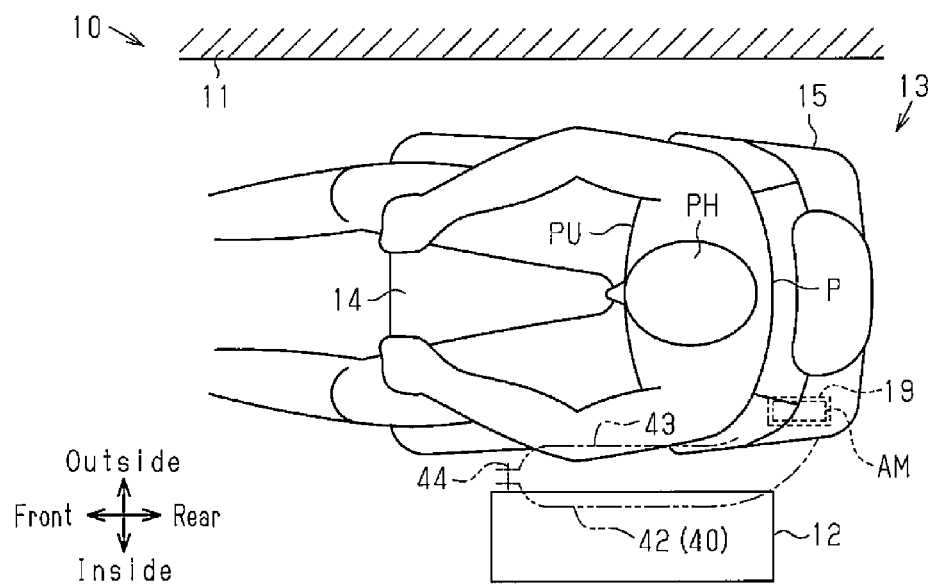
FIG. 2 is a cross-sectional plan view showing the positional relationship of the automobile seat, the airbag, the occupant, the center console box, and a body side portion in the embodiment of FIG. 1.

As shown in FIGS. 1 to 3, vehicle seats, which are automobile seats 13, are arranged on the inner side of a vehicle, which is an automobile 10. For example, in the front section of the passenger compartment, a pair of automobile seats 13, which function as the driver's seat and the front passenger seat, are arranged side by side in the width direction of the automobile 10. A part of the automobile 10 located on the outer side of each automobile seat 13 is formed by a body side portion 11, which includes a door and pillars. A center console box 12 is arranged between the automobile seats 13.

Each automobile seat 13 includes a seat cushion 14 and a seat back 15, which extends upward from the rear end of the seat cushion 14. The tilt angle of the seat back 15 is adjustable.

The internal structure of a side portion of the seat back 15 on the inner side will now be described.

The seat back 15 incorporates a seat frame, which forms the framework. A part of the seat frame forms a side frame portion 16, which is located in the inner side portion of the seat back 15 as shown in FIG. 4. The side frame portion 16 is formed by bending a metal plate. A seat pad 17, which is made of an elastic material such as urethane foam, is provided on the front side of the seat frame, which includes the side frame portion 16. Also, a hard back board 18, which is formed, for example, of plastic, is arranged on the back of the seat frame. Although the seat pad 17 is coated with a cover, the cover is not illustrated in FIG. 4.

In the seat pad 17, a storage portion 19 is provided in the inner side portion of the side frame portion 16. The storage portion 19 accommodates an airbag module AM, which forms a main part of the far side airbag apparatus. When an impact is applied to the automobile 10 from the side of the automobile seat 13 (from below as viewed in FIG. 4) due to a side collision, the far side airbag apparatus protects an occupant P seated in the automobile seat 13 on the side opposite to the impact.

A slit 21 is formed to extend from a corner of the storage portion 19. The slit 21 extends diagonally forward and toward the inner side. A part between a front corner 17c of the seat pad 17 and the slit 21 (a part surrounded by a long dashed double-short dashed line in FIG. 4) forms a breakable portion 22, which is designed to be broken by an airbag 40, which will be discussed below.

The airbag module AM includes as its main components a gas generator 30 and the airbag 40. These components will now be described.

<Gas Generator 30>

The gas generator 30 includes an inflator 31 and a retainer 32, which surrounds the inflator 31. A pyrotechnic type inflator is employed as the inflator 31. The inflator 31 is substantially columnar and accommodates therein a gas generating agent (not shown), which generates inflation gas. The inflator 31 has a gas outlet (not shown) at the upper end. A harness (not shown) for delivering activation signals to the inflator 31 is connected to the lower end of the inflator 31.

In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The retainer 32 functions as a diffuser for controlling the direction of discharged inflation gas and also serves to fasten the inflator 31, together with the airbag 40, to the side frame portion 16. Most of the retainer 32 is formed by bending a plate such as a metal plate into a cylindrical shape. Bolts 33, which are fixed to the retainer 32, serve as fixing portions for attaching the retainer 32 to the side frame portion 16. In the present embodiment, two bolts 33 are provided. The gas generator 30 may be formed by integrating the inflator 31 and the retainer 32.

<Airbag 40>

Figure 5:
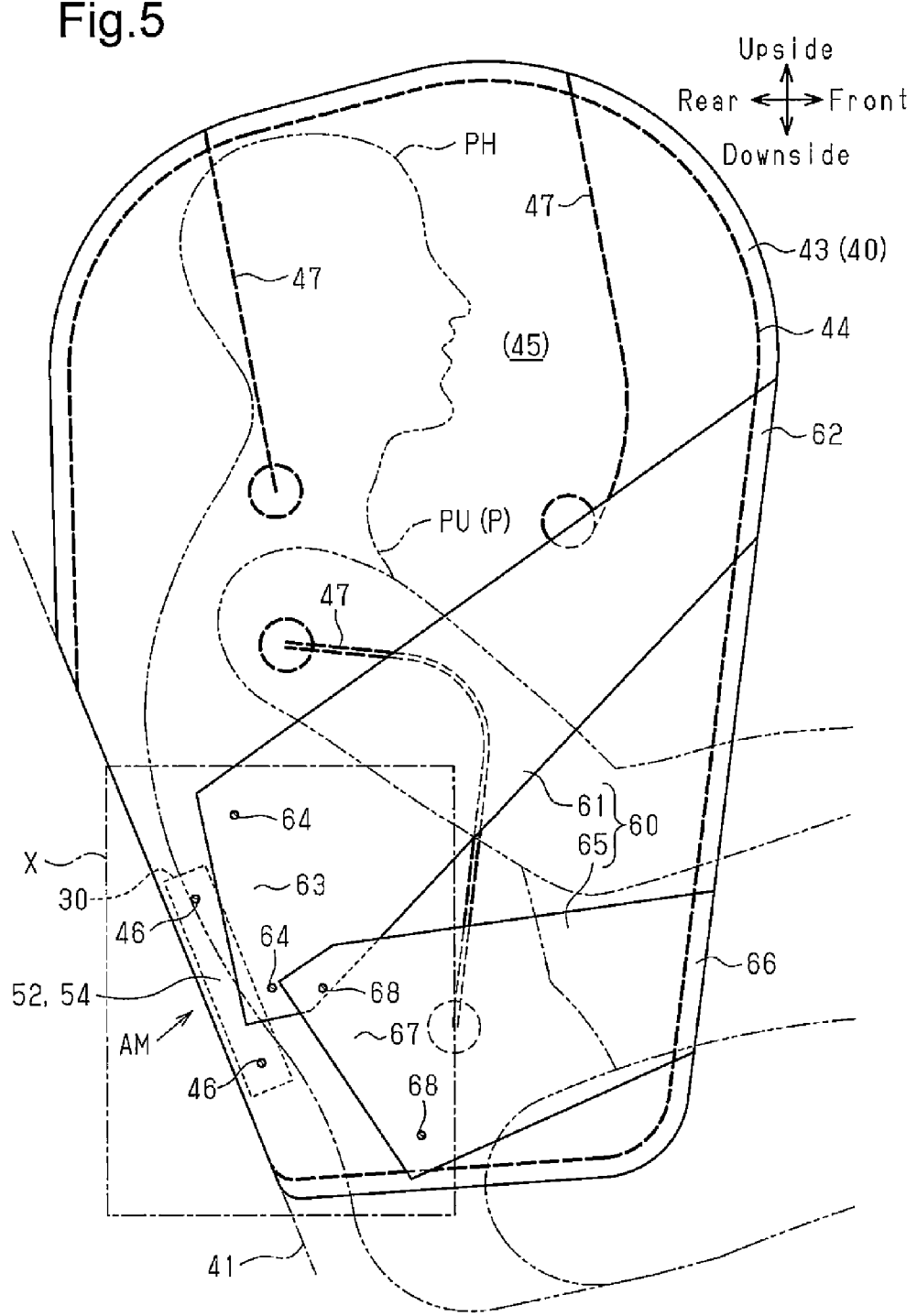
FIG. 5 is a side view of the airbag module, illustrating, together with the occupant, a state before the rear ends of an upper strap portion and a lower strap portion are attached to the airbag in an uninflated and deployed state in the embodiment of FIG. 1.
Figure 6:
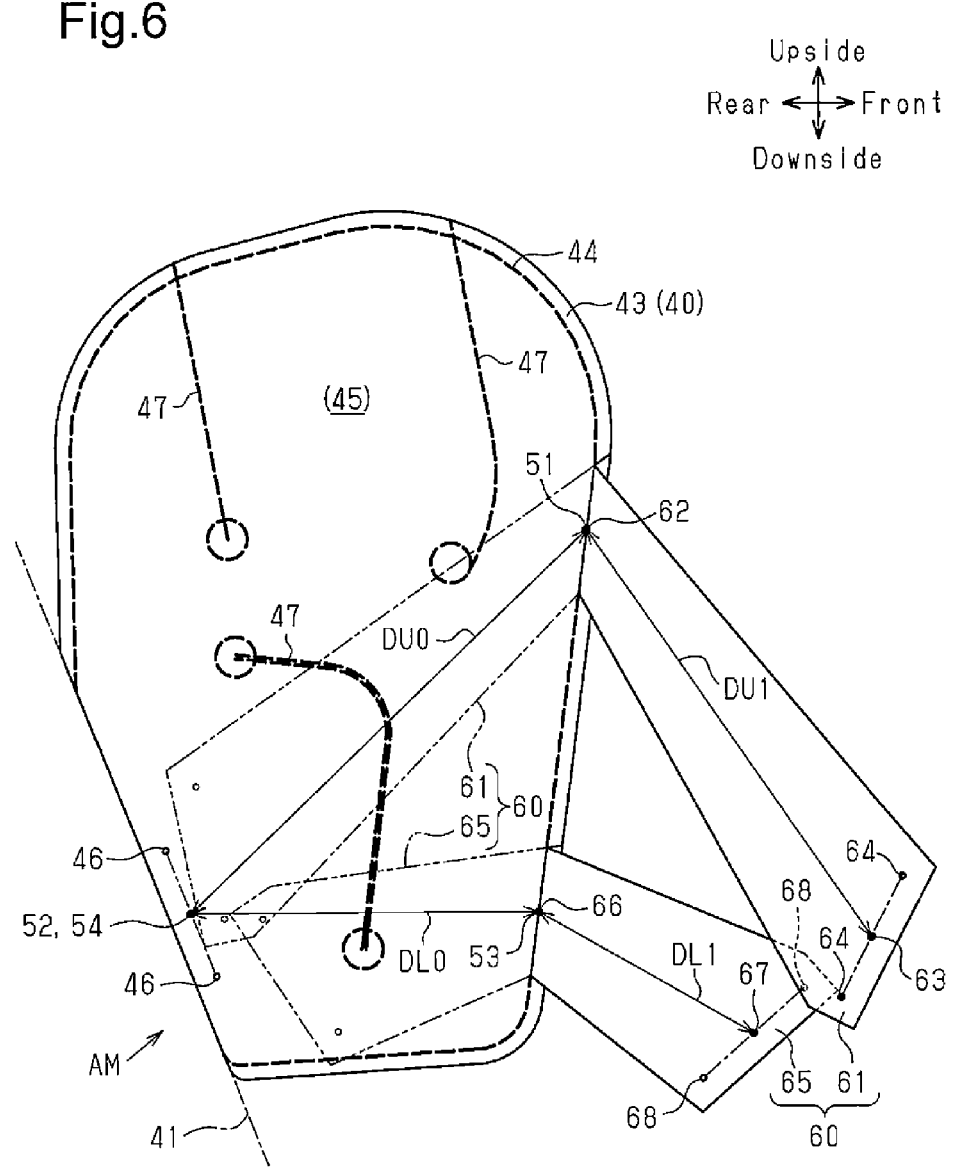
FIG. 6 is a side view of the airbag module, illustrating a state before the rear ends of the upper strap portion and the lower strap portion are attached to the airbag in an uninflated and deployed state in the embodiment of FIG. 1.

FIGS. 5 and 6 show the airbag module AM in a state in which the airbag 40 is deployed in a planar form without being filled with inflation gas (hereinafter, referred to as an uninflated and deployed state).

The airbag 40 is formed by folding forward a single fabric piece (also referred to as a base fabric or a fabric panel) along a first folding line 41, which is defined at the center, to be overlapped in the automobile width direction, and joining the overlapped parts to form a bag shape. To distinguish the two overlapped parts of the airbag 40, the part located on the inner side will be referred to as a first fabric portion 42 (see FIG. 7), and the part located on the outer side will be referred to as a second fabric portion 43.

In the present embodiment, the fabric piece is folded in half such that the first folding line 41 is located at the rear end of the airbag 40. However, the fabric piece may be folded in half such that the first folding line 41 is located at another end such as the front end, the upper end, or the lower end. The airbag 40 may also be formed of two fabric pieces divided along the first folding line 41. In this case, the airbag 40 is formed by overlapping two fabric pieces in the automobile width direction and joining the entire peripheries of the fabric pieces to each other. At least one of the fabric portions 42, 43 may be formed by two or more fabric pieces.

The fabric portions 42, 43 are preferably formed of a material that is strong, flexible to facilitate folding, and resists stretching. The material may be, for example, woven cloth formed of polyester threads or polyamide threads.

The fabric portions 42, 43 are joined to each other at a peripheral joint portion 44 provided along the peripheries of the fabric portions 42, 43. The peripheral joint portion 44 is formed by sewing, with sewing threads, part of the peripheries of the fabric portions 43, 44 except for the rear end (the part in the vicinity of the first folding line 41).

In FIGS. 5 to 8, sewn portions are indicated by first and second broken lines. The first broken line includes thick line segments with a certain length arranged intermittently and represents sewing threads as viewed from the side (refer to the peripheral joint portion 44 in FIG. 5). The second broken line includes thin line segments with a certain length (longer than that of a typical broken line) arranged intermittently and represents the state of sewing threads that are located, for example, behind a fabric piece and cannot be seen directly (refer to some of joint portions 47 in FIG. 5).

The peripheral joint portion 44 may be formed by a method other than sewing using sewing threads. For example, the peripheral joint portion 44 may be formed by adhesion with an adhesive.

Figure 7:
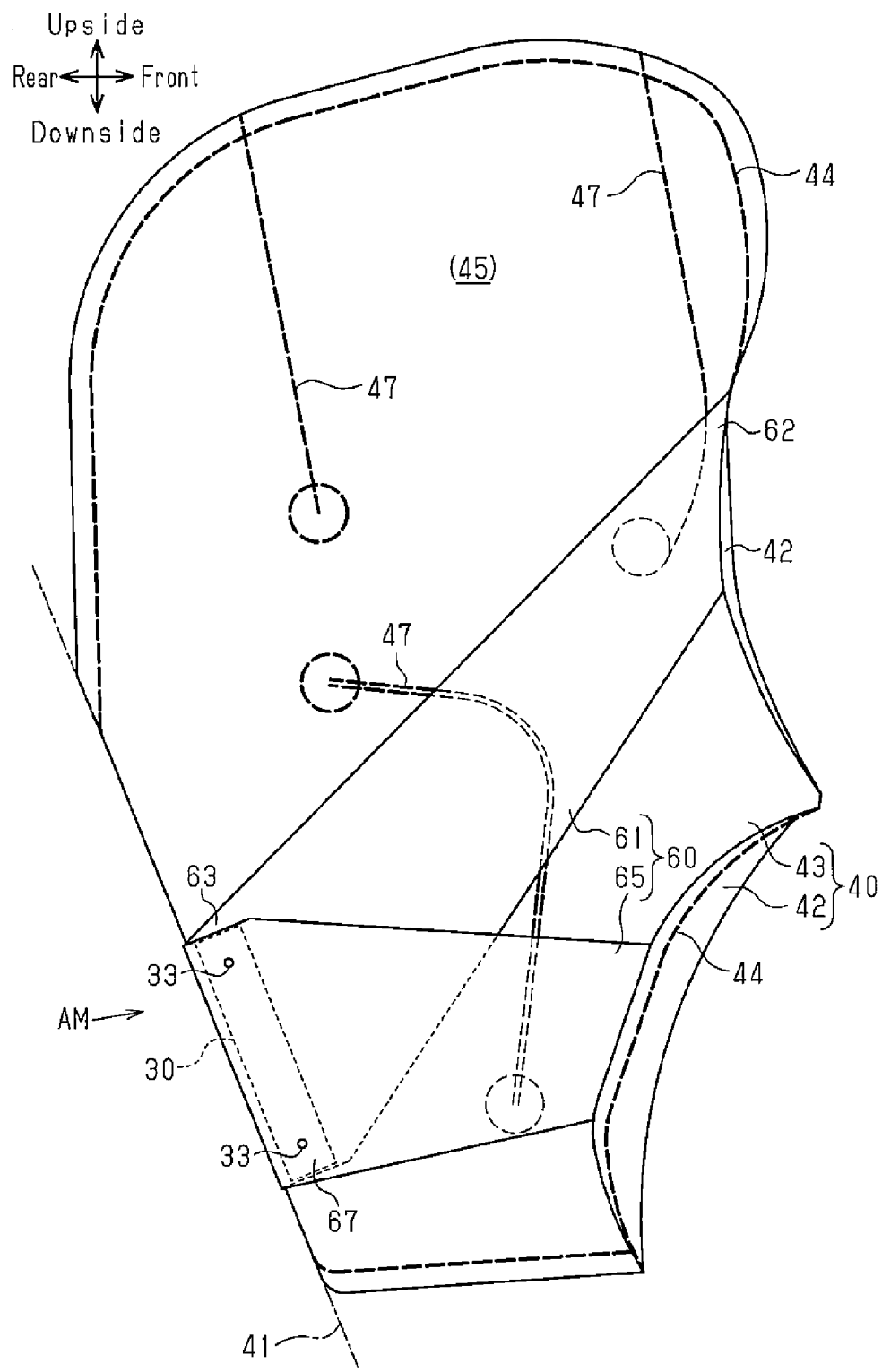
FIG. 7 is a side view of the airbag module, illustrating a state after the rear ends of the upper strap portion and the lower strap portion are attached to the airbag in an uninflated and deployed state in the embodiment of FIG. 1.

As shown in FIGS. 5 to 7, the space between the fabric portions 42, 43 surrounded by the peripheral joint portion 44 and the first folding line 41 serves as an inflation portion 45, which is deployed and inflated with inflation gas.

The position and the vertical measurement of the inflation portion 45 are determined such that, when the inflation portion 45 is deployed and inflated, the lower end of the inflation portion 45 is located below the upper end of the center console 12, and the upper end of the inflation portion 45 is located above the head PH of the occupant P (refer to FIGS. 1 and 3). In other words, the airbag 40 includes a first section, which is deployed and inflated at a position in the vicinity of the side of the upper body of the occupant P seated in the automobile seat 13, including the head PH.

The outer side second fabric portion 43 has two first bolt holes 46 at the rear lower part. The first bolt holes 46 receive the two bolts 33 of the gas generator 30.

To form a passage for inflation gas in the inflation portion 45, the fabric portions 42, 43 are joined to each other with the joint portions 47 at multiple positions. At the parts joined by the joint portions 47, the fabric portions 42, 43 are held in contact with each other. Although the joint portions 47 are formed by sewing the fabric portions 42, 43 together, the joint portions 47 may be formed by adhesion.

The gas generator 30 is arranged in the inflation portion 45 to extend substantially vertically. By inserting the bolts 33 through the first bolt holes 46, the gas generator 30 is secured to the airbag 40 with its position is determined.

A strap 60 is arranged between the airbag 40 and the occupant (on the outer side).

<Strap 60>

The strap 60 includes an upper strap portion 61, which is tensioned when the airbag 40 is deployed and inflated, and a lower strap portion 65, which is located below the upper strap portion 61. When the airbag 40 is deployed and inflated, the lower strap portion 65 is tensioned with a greater tensile force than that of the upper strap portion 61. The upper strap portion 61 and the lower strap portion 65 both have a belt-like shape and are made of the same material as that of the fabric portions 42, 43.

The upper strap portion 61 is configured by a fabric piece, the width of which increases toward the rear end. The upper strap portion 61 has two second bolt holes 64 at a rear end 63. The bolts 33 of the gas generator 30 are inserted through the second bolt holes 64.

Figure 8:
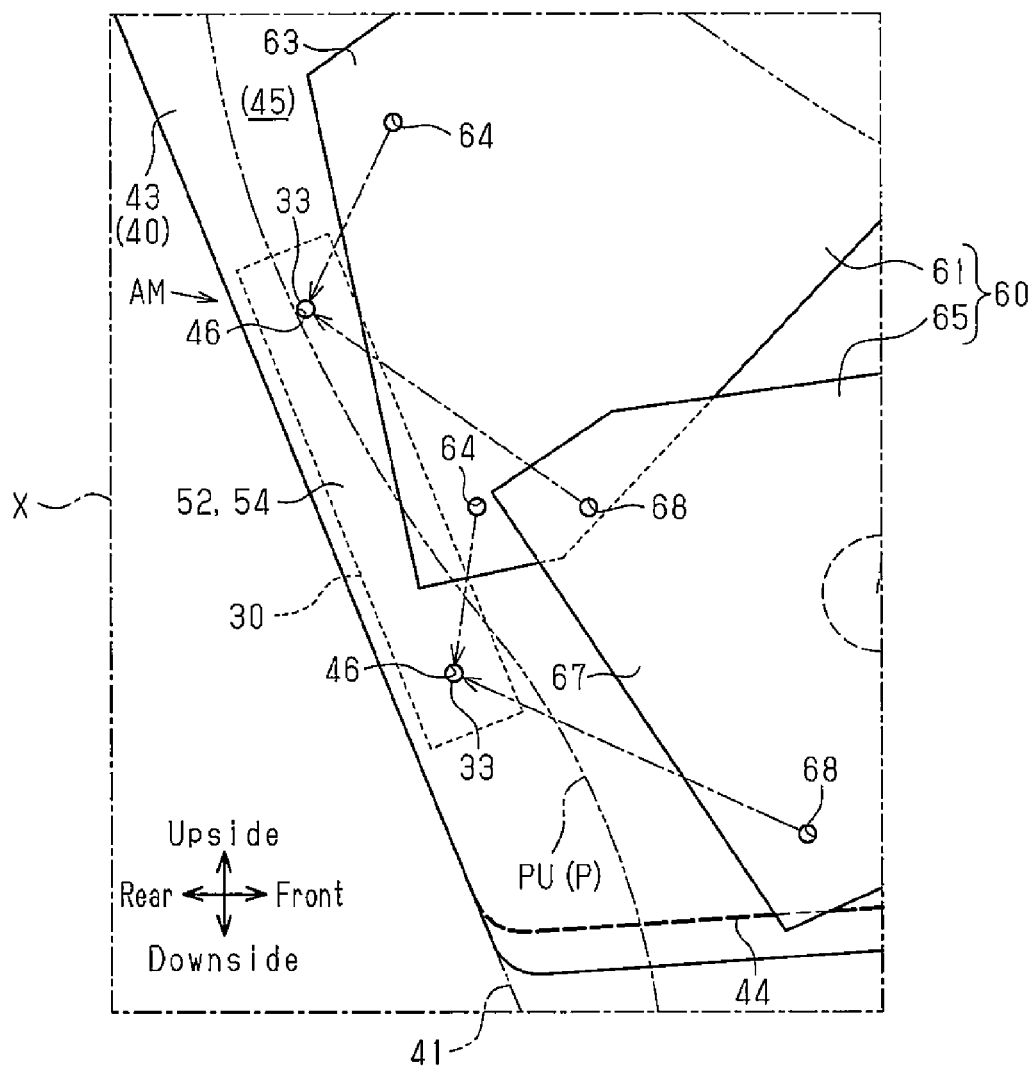
FIG. 8 is a partial side view of area X of FIG. 5.

To attach the upper strap portion 61 to the airbag 40 at the rear end 63 and the front end 62, the airbag 40 has an upper rear attachment portion 52 and an upper front attachment portion 51. The upper rear attachment portion 52 is formed by a part about the first bolt holes 46, which are located at the rear lower portion of the second fabric portion 43. The upper front attachment portion 51 is formed by a front upper portion of the second fabric portion 43 that is located above the upper rear attachment portion 52. The front end 62 of the upper strap portion 61 is sewn to the upper front attachment portion 51. In the present embodiment, the front end 62 and the upper front attachment portion 51 are sewn to each other at part of the peripheral joint portion 44. The bolts 33 are passed through the first bolt holes 46 of the second fabric portion 43 and then passed through the second bolt holes 64 of the upper strap portion 61 as shown in FIG. 8, so that the rear end 63 of the upper strap portion 61 is attached to the upper rear attachment portion 52. Thus, the upper strap portion 61, which is inclined to rise toward the front end, bridges the upper front attachment portion 51 and the upper rear attachment portion 52.

As shown in FIG. 6, the distance between the front end 62 and the rear end 63 of the upper strap portion 61 in a deployed state is defined as a first distance DU1. The distance between the upper front attachment portion 51 and the upper rear attachment portion 52 of the airbag 40 in an uninflated and deployed state is defined as a second distance DU0. The first distance DU1 is set to be shorter than the second distance DU0. Thus, when the upper front attachment portion 51 and the upper rear attachment portion 52 are bridged by the upper strap portion 61, the upper strap portion 61 is pulled diagonally rearward and downward such that the second bolt holes 64 overlap the first bolt holes 46, as indicated by arrows in FIG. 8. Accordingly, the front upper end of the airbag 40, to which the front end 62 of the upper strap portion 61 is attached, is pulled in the same direction and deformed as shown in FIG. 7.

As shown in FIG. 6, in the joined part of the upper strap portion 61 that is joined at the peripheral joint portion 44, the center in the length of the joined part is defined as the front end 62, and the center between the two second bolt holes 64 is defined as the rear end 63. In a part of the airbag 40 to which the upper strap portion 61 is joined at the peripheral joint portion 44, the center in the length of the joined part is defined as the upper front attachment portion 51, and the center between the two first bolt holes 46 is defined as the upper rear attachment portion 52.

The lower strap portion 65 is formed by a fabric piece that is shorter than the upper strap portion 61. The width of the lower strap portion 65 increases toward the rear end. The lower strap portion 65 has two third bolt holes 68 at a rear end 67. The bolts 33 of the gas generator 30 are inserted through the third bolt holes 68.

To attach the lower strap portion 65 to the airbag 40 at the rear end 67 and the front end 66, the airbag 40 has a lower rear attachment portion 54 and a lower front attachment portion 53. The lower rear attachment portion 54 is formed by a part about the first bolt holes 46, which are located at the rear lower portion of the second fabric portion 43.

The lower front attachment portion 53 is formed by a front lower portion of the second fabric portion 43 that is located substantially as high as the lower rear attachment portion 54. The front end 66 of the lower strap portion 65 is sewn to the lower front attachment portion 53. In the present embodiment, the front end 66 of the lower strap portion 65 and the lower front attachment portion 53 are sewn to each other at a part of the peripheral joint portion 44. The bolts 33 are passed through the first bolt holes 46 of the second fabric portion 43 and the second bolt holes 64 of the upper strap portion 61 and then passed through the third bolt holes 68 of the lower strap portion 65 as shown in FIG. 8, so that the rear end 67 of the lower strap portion 65 is attached to the lower rear attachment portion 54. In this manner, the lower strap portion 65, which extends in the front-rear direction, bridges the lower front attachment portion 53 and the lower rear attachment portion 54.

The lower strap portion 65 is made of a component separate from the upper strap portion 61. Therefore, the lower strap portion 65 is attached to the airbag 40 without being influenced by the upper strap portion 61.

As shown in FIG. 6, the distance between the front end 66 and the rear end 67 of the lower strap portion 65 in a deployed state is defined as a third distance DL1. The distance between the lower front attachment portion 53 and the lower rear attachment portion 54 of the airbag 40 in an uninflated and deployed state is defined as a fourth distance DL0. In the present embodiment, the third distance DL1 is set to be shorter than the first distance DU1 and the fourth distance DL0. Thus, when the lower front attachment portion 53 and the lower rear attachment portion 54 are bridged by the lower strap portion 65, the lower strap portion 65 is pulled rearward such that the third bolt holes 68 overlap the first bolt holes 46, as indicated by arrows in FIG. 8. Accordingly, the front lower end of the airbag 40, which is attached to the front end 66 of the lower strap portion 65, is pulled in the same direction and deformed as shown in FIG. 7.

As shown in FIG. 6, in the joined part of the lower strap portion 65 that is joined at the peripheral joint portion 44, the center in the length of the joined part is defined as the front end 66, and the center between the two third bolt holes 68 is defined as the rear end 67. In a part of the airbag 40 to which the lower strap portion 65 is joined at the peripheral joint portion 44, the center in the length of the joined part is defined as the lower front attachment portion 53, and the center between the two first bolt holes 46 is defined as the lower rear attachment portion 54.

Further, the difference between the fourth distance DL0 and the third distance DL1 is defined as a difference $\Delta DL$. The difference between the second distance DU0 and the first distance DU1 is defined as a difference $\Delta DU$. The difference $\Delta DL$ is set to be greater than the difference $\Delta DU$.

As described above, a rear lower portion of the second fabric portion 43 serves as the upper rear attachment portion 52 and the lower rear attachment portion 54. As shown in FIG. 7, the rear end 63 of the upper strap portion 61 and the rear end 67 of the lower strap portion 65 are attached to the same position in the rear lower portion of the airbag 40. The rear end 67 of the lower strap portion 65 is overlapped onto the rear end 63 of the upper strap portion 61. Therefore, by the margin of the overlapped area, the area on the second fabric portion 43, which configures the side of the airbag 40 facing the occupant, occupied by the rear ends 63, 67 is reduced.

The airbag module AM is brought into a compact storage form as shown in FIG. 4 by folding the airbag 40 in an uninflated and deployed state (refer to FIG. 7), to which the upper strap portion 61 and the lower strap portion 65 are attached. The airbag module AM is folded in this manner so that it is suitable for being accommodated in the storage portion 19, which has a limited size in the seat back 15. For example, the roll-folding and the accordion-folding are suitable as methods for folding the airbag 40, the upper strap portion 61, and the lower strap portion 65. The roll-folding refers to a folding method in which most part of the airbag 40 is wrapped about an end. The accordion-folding refers to a folding method in which the airbag 40 is repeatedly folded by a constant width while alternating the folding direction.

The bolts 33, which extend from the gas generator 30 and are passed through the bolt holes 46, 64, 68, are passed through the side frame portion 16, and a nut 34 is threaded onto each bolt 33. This fixes the gas generator 30 to the side frame portion 16, together with the airbag 40, the upper strap portion 61, and the lower strap portion 65.

In this manner, the airbag 40 is fixed to the side frame portion 16 with the bolts 33 provided on the gas generator 30, and the upper strap portion 61 and the lower strap portion 65 are fixed to the second fabric portion 43. This reduces the number of components and the number of steps required for fixing and installing the airbag 40, the upper strap portion 61 and the lower strap portion 65. As described above, the first bolt holes 46, which are located in the lower rear portion of the airbag 40, are used for fixing the airbag 40 to the side frame portion 16. That is, the airbag 40 is fixed to the side frame portion 16 via the first bolt holes 46, which serve as attaching portions.

The gas generator 30 may be attached to the side frame portion 16 using members other than the bolts 33 and the nuts 34. The inflator 31 may be directly attached to the side frame portion 16 without using the retainer 32.

As shown in FIG. 1, the far side airbag apparatus includes an impact sensor 71 and a controller 72 in addition to the airbag module AM. The impact sensor 71 is provided in the body side portion 11 of the automobile 10. The impact sensor 71 includes an acceleration sensor and detects an impact applied to the body side portion 11 from the side. The controller 72 controls activation of the gas generator 30 (the inflator 31) based on a detection signal from the impact sensor 71.

Further, the automobile 10 is equipped with a near side airbag apparatus (not shown), which deploys and inflates an airbag between a body side portion 11 and an automobile seat 13 to restrain an occupant closer to the body side portion 11 to which an impact due to a side collision has been applied, thereby protecting the occupant from the impact.

A seat belt apparatus (not shown) for restraining the occupant P seated on the automobile seat 13 is installed in the passenger compartment.

Operation of the far airbag apparatus according to the above described embodiment will now be described.

When the impact sensor 71 does not detect any impact from the side of the body side portion 11, the controller 72 does not output to the gas generator 30 (the inflator 31) an activation signal for activating the gas generator 30. Thus, the inflator 31 does not discharge inflation gas. The airbag 40 remains accommodated in the storage portion 19 in the storage form. The upper strap portion 61 and the lower strap portion 65 remain folded with the airbag 40 and accommodated in the storage portion 19.

When an impact due to a side collision is applied to the body side portion 11 on one side in a state in which an occupant P is seated in each of the automobile seats 13 on both sides in the automobile width direction, the occupant P on the side of the airbag 40 opposite from the side of impact acts to fall toward the impact side. The impact side and the side opposite to the impact are used for distinguishing the automobile seats 13 arranged side by side in the automobile width direction and the occupants P seated in the automobile seats 13. The impact side refers to the side close to the body side portion 11 to which the impact of a side collision has been applied (the near side), and the side opposite to the impact refers to the side far from that body side portion 11 (the far side).

When the impact sensor 71 detects that an impact of a magnitude greater than or equal to a predetermined value has been applied to a body side portion 11, the controller 72, based on the detection signal, outputs an activation signal for activating the gas generator 30 (the inflator 31) to the gas generator 30. In response to the activation signal, the inflator 31 discharges inflation gas. When the inflation gas is supplied to the airbag 40 in the storage form, the airbag 40 starts being inflated while being unfolded.

In the middle of deployment and inflation, the airbag 40 presses the seat pad 17 in the vicinity of the storage portion 19 and breaks the seat pad 17 at the breakable portion 22 (see FIG. 4). The airbag 40 is projected forward from the storage portion 19 with a part of the airbag 40 remaining in the storage portion 19. Specifically, the part of the airbag 40 that is fixed to the side frame portion 16 and the part in the vicinity remain in the storage portion 19.

As the supply of inflation gas is continued, the airbag 40 is deployed and inflated diagonally upward at a position in the vicinity of the side of the upper body PU of the occupant P, including the head PH.

At this time, since the airbag 40 is fixed to the side frame portion 16 only at the rear lower portion, if no measures were taken for the airbag 40, the momentum of the diagonally forward and upward deployment and inflation of the airbag 40 would cause the airbag 40 to act to fall forward in a rotating manner about the part at which the airbag 40 is fixed to the side frame portion 16. This would cause the airbag 40 to be projected forward of a predetermined deployment area Z1. The deployment area Z1 is an area occupied by the airbag 40 when deployment and inflation of the airbag 40 are complete. Thereafter, in reaction, the airbag 40 would act to fall rearward in a rotating manner as indicated by the arrow in FIG. 9B and be projected rearward from the deployment area Z1. In this manner, the airbag 40 would be deployed and inflated with the unnecessary movements in the front-rear direction.

However, in the present embodiment, the airbag 40 has the upper strap portion 61 and the lower strap portion 65, which are attached to the second fabric portion 43 in a bridging manner. The first distance DU1 of the upper strap portion 61 is shorter than the second distance DU0. Thus, as the airbag 40 is deployed and inflated, the upper strap portion 61 is tensioned to apply tensile force to the airbag 40.

The third distance DL1 of the lower strap portion 65 is shorter than the fourth distance DL0. Thus, as the airbag 40 is deployed and inflated, the lower strap portion 65 is tensioned.

Since the difference $\Delta DL$ is set to be greater than the difference $\Delta DU$, the lower strap portion 65 is tensioned with a tensile force greater than that of the upper strap portion 61 when the airbag 40 is deployed and inflated, so that the lower strap portion 65 applies, to the airbag 40, a tensile force that is greater than that of the upper strap portion 61.

The tensile force of the upper strap portion 61 and the tensile force of the lower strap portion 65 restrict the airbag 40 from acting to rotate forward about the part at which the airbag 40 is fixed to the side frame portion 16.

Particularly, in the present embodiment, the third distance DL1 of the lower strap portion 65 is shorter than the first distance DU1 of the upper strap portion 61. Thus, the lower strap portion 65 becomes tensioned at an earlier stage than the upper strap portion 61 and starts applying tensile force to the airbag 40 at an early stage. As a result, compared to a case in which the lower strap portion 65 is not provided, forward rotation of the airbag 40 is restricted at an earlier stage.

Since its forward rotation is restricted, the airbag 40 is unlikely to fall forward.

If the upper strap portion 61 is slackened when the airbag 40 is rotated rearward in reaction, the lower strap portion 65 remains tensioned. The tensile force of the lower strap portion 65 restricts rearward rotation of the airbag 40, thereby restraining the airbag 40 from falling rearward.

As indicated by the arrow in FIG. 10A, the airbag 40 is deployed and inflated diagonally forward and upward without unnecessary movements in the front-rear direction. Then, when the airbag 40 is deployed and inflated in the deployment area Z1 as shown in FIG. 10B, the lower end of the airbag 40 is located between the occupant P seated in the automobile seat 13 and the center console 12.

The airbag 40 is deployed and inflated in the above described manner, so that the space above the automobile seats 13 is partitioned by the airbag 40 with respect to the width direction of the automobile 10. In other words, the airbag 40 is arranged between the occupants P seated in the automobile seats 13. At this time, the upper strap portion 61 and the lower strap portion 65, which are tensioned, function to restrict the airbag 40 from moving toward the side of the side impact.

When the occupant P on the side opposite to the impact falls to the impact side, the upper strap portion 61 and the lower strap portion 65 are pushed by the occupant P. Accordingly, the tensile force of the upper strap portion 61 and the lower strap portion 65 is further increased, so that movement of the airbag 40 toward the impact side is more effectively restricted. Therefore, even if the airbag 40 receives the load due to falling of the occupant P on the side opposite to the impact, the load is received by the airbag 40. This reduces the impact applied to the occupant P.

In the present embodiment, a case has been described in which the airbag 40 is deployed and inflated between two occupants P seated in the automobile seats 13, which are arranged side by side in the width direction of the automobile 10. However, the same operation is performed in a case in which an occupant P is seated only in the automobile seat 13 on the side opposite to the impact. Also, in a case in which the automobile seat 13 on the impact side is folded to form a space of a certain volume above the folded automobile seat 13 to place baggage, the same operation will be performed. In this case, the baggage and the occupant P on the side opposite to the impact are prevented from interfering with each other.

The present embodiment as described above achieves the following advantages.

(1) The strap 60 includes the upper strap portion 61, which is tensioned when the airbag 40 is deployed and inflated, and the lower strap portion 65, which is located below the upper strap portion 61 (FIG. 5). When the airbag 40 is deployed and inflated, the lower strap portion 65 is tensioned with a greater tensile force than that of the upper strap portion 61.

Thus, the upper strap portion 61 and the lower strap portion 65 restrain the airbag 40 from being deployed and inflated with unnecessary movement in the front-rear direction. Therefore, the airbag 40 is prevented from projecting from the deployment area Z1 and is allowed to be deployed and inflated in a short time.

(2) The third distance DL1 of the lower strap portion 65 is set to be shorter than the first distance DU1 of the upper strap portion 61 (FIG. 6).

Thus, compared to a case in which the lower strap portion 65 is not provided, forward rotation of the airbag 40 is restricted at an earlier stage.

(3) The first distance DU1 of the upper strap portion 61 is set to be shorter than the second distance DU0 of the airbag 40. The third distance DL1 of the lower strap portion 65 is set to be shorter than the fourth distance DL0 of the airbag 40. The difference ΔDL between the fourth distance DL0 and the third distance DL1 is set to be greater than the difference ΔDU between the second distance DU0 and the first distance DU1 (FIG. 6).

Thus, when the airbag 40 is deployed and inflated, the upper strap portion 61 and the lower strap portion 65 are tensioned. The lower strap portion 65 is tensioned with a tensile force greater than that of the upper strap portion 61. As a result, the advantage (1) is achieved.

(4) The upper rear attachment portion 52 and the lower rear attachment portion 54 are provided at the same position in the airbag 40 (FIG. 6).

Therefore, the rear end 63 of the upper strap portion 61 and the rear end 67 of the lower strap portion 65 occupy a relatively small area on the second fabric portion 43, which forms the side of the airbag 40 that faces the occupant (the outer side).

(5) The gas generator 30 is fixed to the side frame portion 16 via the bolts 33, which are passed through the first bolt holes 46 of the airbag 40. The rear ends 63, 67 of the upper strap portion 61 and the lower strap portion 65 are attached to the upper rear attachment portion 52 and the lower rear attachment portion 54 via the bolts 33 of the gas generator 30 (FIGS. 7 and 8).

This reduces the number of components and the number of steps required for fixing the airbag 40 to the side frame portion 16 and the number of components and the number of steps required for attaching the rear ends 63, 67 of the upper strap portion 61 and the lower strap portion 65 to the airbag 40.

(6) The upper strap portion 61 and the lower strap portion 65 are configured to be members independent from each other (FIGS. 5 and 6).

Therefore, the upper strap portion 61 and the lower strap portion 65 each can be attached to the airbag 40 without being influenced by the other.

(7) The upper strap portion 61 is arranged to rise toward the front end 62, and the front end 62 is attached to the front upper end of the airbag 40 (FIG. 5).

Thus, the upper strap portion 61 restricts, at a relatively elevated position, the airbag 40 from rotating forward about the position of the airbag 40 that is fixed to the side frame portion 16. Therefore, the airbag 40 is effectively restrained from falling forward and projecting forward from the deployment area Z1.

(8) For example, as in the case of Japanese Laid-Open Patent Publication No. 2005-306377, the rear ends 63, 67 of the upper strap portion 61 and the lower strap portion 65 may be attached to, instead of the airbag 40, the automobile seat 13 at positions closer to the occupant P than the second fabric portion 43 of the airbag 40. In this case, when the airbag 40 is deployed and inflated, the upper strap portion 61 and the lower strap portion 65 are arranged in a bridging manner while being inclined with respect to the front-rear direction. The upper strap portion 61 and the lower strap portion 65 in the inclined state are pushed by the occupant P so that the airbag 40 is supported.

However, in this case, how to store the upper strap portion 61 and the lower strap portion 65 in the automobile seat 13 would be an issue. Further, how to project the upper strap portion 61 and the lower strap portion 65 from the automobile seat 13 at deployment and inflation of the airbag 40 would be an issue.

In this respect, in the present embodiment, the rear ends 63, 67 of the upper strap portion 61 and the lower strap portion 65 are attached to the airbag 40 like the front end 62, 66. Thus, when the airbag 40 is made into the storage form, the upper strap portion 61 and the lower strap portion 65 are folded together with the airbag 40, and the airbag 40 in the storage form is stored in the storage portion 19, so that the upper strap portion 61 and the lower strap portion 65 are stored in the storage portion 19 together with the airbag 40. This configuration also capable of projecting the upper strap portion 61 and the lower strap portion 65 from the storage portion 19 together with the airbag 40 being deployed and inflated.

(9) When the rear ends 63, 67 of the upper strap portion 61 and the lower strap portion 65 are attached to the automobile seat 13 as described in the above advantage (8), the occupant P may not adequately interfere with the upper strap portion 61 and the lower strap portion 65 being projected unless the occupant P is properly leaning against the seat back 15. In this case, the airbag 40 may fail to be deployed or inflated at a proper position, or an arm of the occupant P may be caught by the upper strap portion 61 and the lower strap portion 65.

In this respect, in the present embodiment, the rear ends 63, 67 of the upper strap portion 61 and the lower strap portion 65 are attached to the second fabric portion 43 of the airbag 40. Thus, since the upper strap portion 61 and the lower strap portion 65 are tensioned along the inflated airbag 40, the strap portions 61, 65 are unlikely to interfere with the occupant P. Therefore, an arm of the occupant P is unlikely to be caught by the upper strap portion 61 or the lower strap portion 65, and the airbag 40 is allowed to be deployed and inflated at a proper position.

The above-described embodiment may be modified as follows.

<Regarding Airbag 40>

The rear lower portion of the airbag 40 may be fixed to a member that has a strength different from that of the side frame portion 16 in the automobile seat 13. The rear lower portion of the airbag 40 may be fixed to a member other than the automobile seat 13, for example, to the center console box 12.

Substantially the entire airbag 40 may be configured to be inflated by the inflation portion 45 as in the above-illustrated embodiment, but may also partially include a non-inflation portion, which neither supplied with inflation gas nor inflated.

The upper rear attachment portion 52 and the lower rear attachment portion 54 may be provided at different positions in the airbag 40.

<Regarding Strap 60>

Instead of being provided on the side of the airbag 40 that faces the occupant P (the outer side), the strap 60 may be provided on the side opposite to the occupant P (the inner side). The strap 60 may be provided on each of the side facing the occupant P and the side opposite to the occupant P. In either case, the airbag 40 is restrained from being deployed and inflated with unnecessary movements in the front-rear direction, as in the above illustrated embodiment.

The upper strap portion 61 and the lower strap portion 65 may have a constant width over the entire length.

The rear ends 63, 67 of the upper strap portion 61 and the lower strap portion 65 do not necessarily need to be attached to the part of the airbag 40 at which the airbag 40 is fixed to the side frame portion 16, but may be attached to the vicinity of that fixed part.

At least one of the upper strap portion 61 and the lower strap portion 65 does not necessarily need to have a belt-like shape, but may have a cord-like shape.

The front ends 62, 66 of the upper strap portion 61 and the lower strap portion 65 may be attached to the front end of the second fabric portion 43 at positions separated from the peripheral joint portion 44.

The front ends 62, 66 of the upper strap portion 61 and the lower strap portion 65 may be joined to the second fabric portion 43 by a method other than sewing using the sewing threads, for example, by using an adhesive.

A plurality of upper strap portions 61 or a plurality of lower strap portions 65 may be provided. A plurality of upper strap portions 61 and a plurality of lower strap portions 65 may be provided. In this case, the strap portions located below are tensioned with stronger tensile forces than those of the strap portions located above.

The upper strap portion 61 and the lower strap portion 65 may be parallel or substantially parallel with each other.

The upper strap portion 61 and the lower strap portion 65 may be formed integrally as a single component. In other words, the upper strap portion 61 and the lower strap portion 65 may be formed by a single member.

<Other Modifications>

The above described side impact airbag apparatus may be applied to an automobile 10 in which three or more automobile seats 13 are arranged side by side with respect to the width direction of the automobile 10. In this case, at a side collision of the automobile 10, each airbag 40 is deployed and inflated in the space between two adjacent automobile seats 13.

The above described side impact airbag apparatus is applicable to a near side airbag apparatus, which restrains an occupant P closer to the body side portion 11 to which an impact due to a side collision has been applied.

Automobiles to which the side impact airbag apparatus according to the present invention is applied include various industrial vehicles in addition to private cars.

The above described side impact airbag apparatus can be applied to side impact airbag apparatuses that are mounted on vehicles other than automobiles, for example, airplanes, boats, and ships and protect an occupant seated in a vehicle seat from an impact.

The invention claimed is:

1. A side impact airbag apparatus comprising:
an airbag, which is fixed to a vehicle via an attaching portion and is configured to be deployed and inflated diagonally forward and upward in the vicinity of a side of an occupant seated in a vehicle seat and from a part at which the airbag is fixed to the vehicle via the attaching portion, wherein the airbag includes a front end and a first section, and the attaching portion is located in a rear lower portion of the airbag;
a gas generator, which supplies inflation gas to the airbag in response to an impact applied to the vehicle from a side of the vehicle seat; and
a strap having a front end attached to the front end of the airbag and a rear end attached to one of the part of the airbag at which the airbag is fixed to the vehicle and the vicinity of that fixed part, wherein the strap includes an upper strap portion, which is tensioned when the airbag is deployed and inflated, and a lower strap portion, which is located below the upper strap portion and is tensioned with a tensile force greater than that of the upper strap portion when the airbag is deployed and inflated, wherein
the front end of the airbag includes an upper front attachment portion and a lower front attachment portion,
the rear lower portion of the airbag includes an upper rear attachment portion and a lower rear attachment portion,
a front end of the upper strap portion is attached to the upper front attachment portion of the airbag,
a rear end of the upper strap portion is attached to the upper rear attachment portion of the airbag,
a front end of the lower strap portion is attached to the lower front attachment portion of the airbag,
a rear end of the lower strap portion is attached to the lower rear attachment portion of the airbag,
a state of the airbag in which the airbag is deployed in a planar form without being filled with inflation gas is defined as an uninflated and deployed state,
a distance between the front end and the rear end of the upper strap portion in a deployed state is defined as a first distance,
a distance between the upper front attachment portion and the upper rear attachment portion of the airbag in the uninflated and deployed state is defined as a second distance,
the first distance is set to be shorter than the second distance,
a distance between the front end and the rear end of the lower strap portion in a deployed state is defined as a third distance,
a distance between the lower front attachment portion and the lower rear attachment portion of the airbag in the uninflated and deployed state is defined as a fourth distance,
the third distance is set to be shorter than the fourth distance, and a difference between the fourth distance and the third distance is set to be greater than a difference between the second distance and the first distance.

2. The side impact airbag apparatus according to claim 1, wherein the upper rear attachment portion and the lower rear attachment portion are provided at the same position in the airbag.

3. The side impact airbag apparatus according to claim 2, wherein
the gas generator is arranged in the rear lower portion of the airbag,
the gas generator is fixed to the vehicle via a fixing portion, which protrudes from the gas generator and is passed through the attaching portion of the airbag, and
the rear ends of the upper strap portion and the lower strap portion are attached to the upper rear attachment portion and the lower rear attachment portion via the fixing portion.

4. The side impact airbag apparatus according to claim 1, wherein the upper strap portion and the lower strap portion are configured to be members independent from each other.

* * * * *